(12) United States Patent
Sarukkai et al.

(10) Patent No.: US 7,802,234 B2
(45) Date of Patent: Sep. 21, 2010

(54) INTEGRATION OF CONTEXT-SENSITIVE RUNTIME METRICS INTO INTEGRATED DEVELOPMENT ENVIRONMENTS

(75) Inventors: Sekhar Sarukkai, Sunnyvale, CA (US); Didier Guzzoni, St-Prex (CH); Rajiv Gupta, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1460 days.

(21) Appl. No.: 10/751,333

(22) Filed: Jan. 2, 2004

(65) Prior Publication Data

US 2007/0168913 A1 Jul. 19, 2007

Related U.S. Application Data

(60) Provisional application No. 60/437,441, filed on Jan. 2, 2003, provisional application No. 60/437,443, filed on Jan. 2, 2003.

(51) Int. Cl.
*G06F 9/44* (2006.01)

(52) U.S. Cl. .................. 717/127; 717/100; 717/125; 717/131

(58) Field of Classification Search .......... 717/127, 717/101; 709/224
See application file for complete search history.

(56) References Cited

U.S. PATENT DOCUMENTS

| | | | |
|---|---|---|---|
| 6,487,594 B1 | 11/2002 | Bahlmann | |
| 6,801,940 B1 * | 10/2004 | Moran et al. | 709/224 |
| 7,016,953 B2 * | 3/2006 | Lemon | 709/224 |
| 7,039,037 B2 | 5/2006 | Wang et al. | |
| 7,103,876 B1 * | 9/2006 | Lopez et al. | 717/127 |
| 7,216,343 B2 | 5/2007 | Das et al. | |
| 7,266,810 B2 * | 9/2007 | Karkare et al. | 717/130 |
| 7,272,625 B1 | 9/2007 | Hannel et al. | |
| 7,437,752 B2 | 10/2008 | Heard et al. | |
| 2002/0016954 A1 * | 2/2002 | Charisius et al. | 717/2 |
| 2003/0084168 A1 | 5/2003 | Erickson et al. | |
| 2003/0225801 A1 | 12/2003 | Devarakonda et al. | |

(Continued)

OTHER PUBLICATIONS

"An online programming assessment tool", Roberts et al., Jan. 2003, pp. 69-75, <http://delivery.acm.org/10.1145/860000/858412/p69-roberts.pdf>.*

(Continued)

*Primary Examiner*—Tuan Q Dam
*Assistant Examiner*—Thuy Dao
(74) *Attorney, Agent, or Firm*—Townsend and Townsend and Crew LLP

(57) ABSTRACT

An integrated development environment (IDE) includes a runtime environment and user interface. A user of the IDE specifies an application component to be monitored, and metrics for the specified application component are transmitted by the IDE runtime environment to a data collector belonging to the IDE user interface for display to the user. In addition, support is offered for the separation of operational concerns from business logic, allowing developers to control the operational aspects from a policy manager of the IDE user interface. Using the policy manager, developers invoke policy agents to add predefined code segments to applications, saving the developer from having to recode the same operational logic each time an application is updated to contain a new policy related to business logic.

20 Claims, 4 Drawing Sheets

U.S. PATENT DOCUMENTS

| | | | |
|---|---|---|---|
| 2003/0229677 A1* | 12/2003 | Allan | 709/217 |
| 2004/0006760 A1* | 1/2004 | Gove et al. | 717/100 |
| 2004/0040014 A1* | 2/2004 | Ball | 717/130 |
| 2005/0172306 A1* | 8/2005 | Agarwal et al. | 719/328 |
| 2007/0168913 A1 | 7/2007 | Gupta et al. | |

OTHER PUBLICATIONS

"Dynamic metrics for java", Dufour et al., Nov. 2003, pp. 149-168, <http://delivery.acm.org/10.1145/950000/949320/p149-dufour.pdf>.*

"Performance monitoring of java applications", Harkema et al., Jul. 2002, pp. 114-127, <http://delivery.acm.org/10.1145/590000/584388/p114-harkema.pdf>.*

"*J: a tool for dynamic analysis of Java programs", Dufour et al., Oct. 2003, pp. 306-307, <http://delivery.acm.org/10.1145/950000/949425/p306-dufour.pdf>.*

Bloomberg, Jason, "Building Security Into a Service-Oriented Architecture," ZapThink, LLC, White Paper, Waltham, MA, May 2003, pp. 1-15.

Confluent Software, Inc., Internet Archive Wayback Machine, [online © 2001] [Retrieved on Feb. 18, 2004] Retrieved from the Internet<URL:http://web.archive.org/web/*/www.confluentsoftware.com>,p. 1.

Confluent Software, Inc., "Transform to Real-Time Enterprise," [online © 2002] [Retrieved on Feb. 18, 2004] Retrieved from the Internet<URL:http://web.archive.org/web/20021128005926/http://www.confluentsoftware.com/>, p. 1.

Confluent Software, Inc., Site Map, [online © 2002] [Retrieved on Feb. 18, 2004] Retrieved from the Internet<URL:http://web.archive.org/web/20030212235316/www.confluentsoftware.com/sitemap.html>, pp. 1-2.

Confluent Software, Inc., White Papers, [online © 2002] [Retrieved on Feb. 18, 2004] Retrieved from the Internet<URL:http://web.archive.org/web/20030202155155/www.confluentsoftware.com/solutions/whitepapers.html>, pp. 1-3.

Confluent Software, Inc., Case Studies, [online ©2002] [Retrieved on Feb. 18, 2004] Retrieved from the Internet<URL: http://web.archive.org/web/20030202153107/www.confluentsoftware.com/solutions/casestudies.html>, pp. 1-2.

Confluent Software, Inc., CORE Web Services Monitoring and Management, [online ©2002] [Retrieved on Feb. 18, 2004] Retrieved from the Internet<URL: http://web.archive.org/web/20030408031014/http://www.confluentsoftware.com/>, p. 1.

Confluent Software, Inc., Solutions, [online ©2002] [Retrieved on Feb. 18, 2004] Retrieved from the Internet<URL: pp. 1-3. http://web.archive.org/web/20021103121216/www.confluentsoftware.com/solutions/index.html>.

Confluent Software, Inc., Solutions: CORE Analyzer, [online © 2002] [Retrieved on Feb. 18, 2004] Retrieved from the Internet<URL: pp. 1-2 http://web.archive.org/web/20030202152959/www.confluentsoftware.com/solutions/coreanalyzer.html>.

Confluent Software, Inc., Solutions: CORE Integrator, [online © 2002] [Retrieved on Feb. 18, 2004] Retrieved from the Internet<URL: pp. 1-2. http://web.archive.org/web/20030202153730/www.confluentsoftware.com/solutions/coreinteg.html>.

Confluent Software, Inc., Solutions: CORE Manager, [online ©2002] [Retrieved on Feb. 18, 2004] Retrieved from the Internet<URL: pp. 1-2. http://web.archive.org/web/20030202154134/www.confluentsoftware.com/solutions/coremgr.html>.

LaMonica, Martin, "Web Services Start-up Cozies up to BEA," CNET News.com, [online] [Retrieved on Sep. 22, 2003], Retrieved from the Internet<URL: http://news.com.com/Web+services+start-up+cozies+up+to+BEA/2100-1001_3-985741.html>, p. 1.

Sarukkai, S. et al., "Web-service As a Layer-Six Technology," Confluent Software, Inc., © 2003, pp. 1-24.

Sarukkai, Sekhar et al., Loosely Coupled, "Web Services and the Forgotten OSI Layer Six," [online Sep. 5, 2003] Retrieved from the Internet<URL: http://www.looselycoupled.com/opinion/2003/saruk-osi-infr0905.html>, pp. 1-4.

WebServices.Org™, "Confluent Software Makes its Debut With New Web Services Platform," [online] [Retrieved on Sep. 22, 2003] Retrieved from the Internet<URL: http://www.mywebservices.org/index.php/article/articleprint/714/-1/2?P...>, pp. 1-5.

U.S. Appl. No. 10/866,508, Advisory Action dated Nov. 4, 2008, 3 pages.

U.S. Appl. No. 10/866,508, Final Rejection dated Aug. 20, 2008, 12 pages.

U.S. Appl. No. 10/866,508, Non-Final Rejection dated Jan. 22, 2009, 4 pages.

U.S. Appl. No. 10/866,508, Non-Final Rejection dated Jul. 6, 2009, 12 pages.

U.S. Appl. No. 10/866,508, Notice of Allowance dated Dec. 23, 2009, 7 pages.

U.S. Appl. No. 10/866,508, Office Action dated Dec. 12, 2007, 11 pages.

* cited by examiner

INTEGRATION OF CONTEXT-SENSITIVE RUNTIME METRICS INTO INTEGRATED DEVELOPMENT ENVIRONMENTS

CROSS-REFERENCE TO RELATED APPLICATIONS

This application claims the benefit of the filing date of U.S. Provisional Application Ser. No. 60/437,441, filed on Jan. 2, 2003, and U.S. Provisional Application Ser. No. 60/437,443, filed on Jan. 2, 2003, both of which are incorporated by reference.

BACKGROUND OF THE INVENTION

1. Field of the Invention

The invention relates generally to an integrated software development environment providing improved access to real-time production data.

2. Description of the Related Art

In the context of software development, there exists a problem of developers not having access to real-world data concerning the operation of the software they develop. Typically, once a package is developed, it is passed along to an operations part of the enterprise, where it is deployed to customers. When customers encounter difficulties using the software, their point of contact is usually the technical support department. Often, very little information about how the software is performing in the real world ends up reaching the developers, even though operations centers and technical support divisions may have very rich data. This is problematic, because by some estimates, more than 70% of developer time is spent working on currently-developed components such as enhancements, bug-fixes, etc.

Various tools have been developed for use by operations and technical support divisions to help ensure that software is functioning once it is deployed, but the tools are not developer-focused. If developers could access production data, they could be more responsive, effective, and help to develop more stable components.

One attempt to solve this problem has been through the use of an Operations Management Console. Using a management console, an operations manager follows a standardized process of generating bug reports, forwarding them to the developers, and waiting for updates. However, this is not the kind of direct feedback needed by developers. Typically, using this methodology, the developer does not see all of the raw information available, but rather only a filtered subset of the data.

Another attempt at solving this problem has been to have a quality assurance (QA) department do testing in a simulated real-world environment, sending the sample data to the developers for review. However, because this typically happens after the developer is already finished development for the product and has moved on to something new, no updates can actually be made until the following release of the software. Further, since the data is not actually real-world data but rather is simulated data, it often does not reflect all real-world characteristics. Thus, this solution is not an optimal one. A solution is needed that will provide developers with access to production metrics in the context of an IDE.

Software development involves the creating of computer code related to business logic as well as to non-business logic, i.e. operational considerations. Business logic is a term understood by those of skill in the art, and refers generally to functionality related to the underlying purpose of the software application. For example, suppose that a particular application includes functionality to enter purchase order information into an order management system. That functionality is supported both by business logic, e.g., updating order status, releasing product to shipping, etc., and by non-business software logic, such as code related to ensuring security, error handing, logging, etc. A problem in the art is the difficulty in making changes to business-logic related code that then requires additional overhead to comply with required policies in effect.

When building a web service or distributed application, a developer's first approach may be to embed each component with its own security and other operational management functionality by adding code individually, on a case-by-case basis. This traditional approach can actually add cost, time and complexity over the service's lifecycle. Potential costs include:

Introduction of potential security holes

Replication of similar functionality for every service

Increases in education and training requirements when implementing new standards Reliance on ad-hoc approaches to visibility of policy compliance Increases in complexity and cost when updating or extending operational functionality Accordingly, there is a need for a system and method for separating the development of software code relating to business logic from operational logic.

SUMMARY OF THE INVENTION

A system of the present invention extracts data by creating a mechanism to examine a run-time environment and collect metrics and send the metrics to an embedded data collector in the context of an IDE user interface. The mechanism is controlled by an IDE user interface (UI) extension pane. The system monitors the IDE run-time collected data to obtain context-specific metrics for the application components, and provides visual feedback in the UI extension pane to the user of the IDE.

By extending the reach of IDEs to incorporate run-time information from production deployments, the present invention enables a single console from which developers can get component-level stability and performance data from QA-lab, staging and production systems. Context-sensitive feedback automatically updates stability and performance metrics based on the component that is currently being viewed by the developer. Artificial barriers between production operation teams and developers are removed, increasing productivity. The present invention eliminates the need for manually intensive efforts to gather and incorporate learning from production deployments. Using the present invention, developers get real-world feedback on stability and performance characteristics of the application they are currently working on, enabling them to incorporate code-level fixes to improve selected run-time characteristics while rolling out future versions of the software. In addition, the present invention allows the selective availability of stability and performance metrics to developers based on authorization levels. Using the present invention, developers can selectively subscribe to alerts for their modules generated in production deployments. Thus, they can choose to be notified of error conditions generated in production.

The present invention provides information from development to testing to operations in a forward fashion. So, for example, the operations department can be informed of which flows and/or components have exhibited higher than a particular threshold of errors in testing, or which have been tested less than a particular threshold. This allows more detailed logging to be turned on in anticipation at production time, for example.

According to the present invention, IDEs can connect to one or more management applications to query metrics of the component being viewed by the developer. For example, if a component developer is developing the next version of a component and wants to know if the current production performance of the application will meet the stability requirements, the developer can use the IDE plug-in to automatically connect to the management application and obtain the relevant performance and stability characteristics. The developer can then drill down to additional levels of detail within the IDE framework.

The present invention also enables efficient software development while at the same time enforcing required policies. Operational concerns are separated from business logic, allowing developers to control the operational aspects from a policy manager. Using the policy manager, developers can invoke agents to add predefined code segments to applications, saving the developer from having to recode the same operational logic each time an application is updated to contain a new policy related to business logic. In an alternative embodiment, a proxy agent exists outside of the runtime context, and has the policy pipeline pushed to it. A policy pipeline is preferably created that specifies a policy to be followed when designated services are created or modified by designated developers. Thus, the policy and business logic remain separated in the context of the IDE, allowing developers a more free hand.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
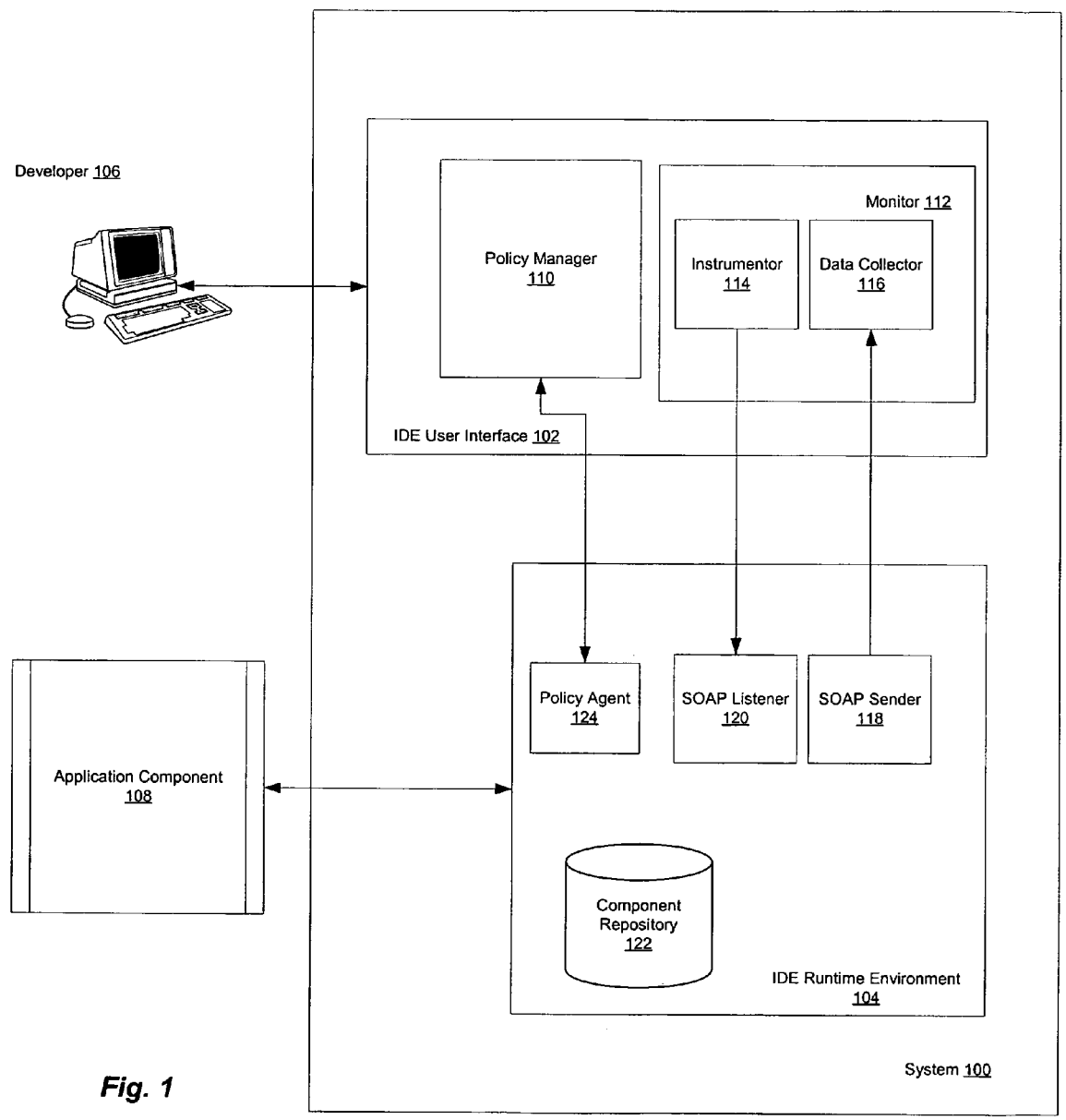
FIG. 1 is a block diagram of a system for integrating run-time metrics into an integrated development environment in accordance with an embodiment of the present invention.

Referring now to FIG. 1, there is shown a block diagram illustrating an example of a system 100 in accordance with the present invention. System 100 includes an IDE UI 102 and an IDE Runtime Environment 104. Also illustrated in FIG. 1 are a developer workstation 106 and application component 108.

IDE UI 102 provides an environment in which the developer 106 can do the actual software development. IDE UI 102 includes a Policy Manager 110, and a Monitor 112. As is known in the art, monitors typically host management applications and collect and report on various characteristics of the hosted applications. However, unlike traditional monitors that operate in a stand-alone fashion, monitor 112 is preferably embedded within the IDE user interface 102 in order to provide a seamless interface between the development environment and the collected production data for developer 106. Monitor 112 includes an instrumentor 114, which enables developer 106 to control the operation of the IDE, for example by specifying a particular application component 108 that should be monitored. Data collector 110 receives metrics extracted from the Runtime Environment 104 and displays it to the developer 106. The metrics that are extracted are preferably those related to the context specified by the developer 106 through the Instrumentor 114. Alternatively, the metrics may be inferred from the environment context of the IDE.

IDE Runtime Environment 104 enables the functionality selected by the developer 106 in the IDE UI 102. Runtime Environment 104 includes sender 118 and listener 120 components for communicating with components of the IDE UI 102. In a preferred embodiment, the listener and sender components use the conventionally-known SOAP (Simple Object Access Protocol) to communicate with the IDE UI 102. Those of skill in the art will appreciate that in an alternative embodiment, JPI (Java Message Service), RMI (Remote Method Invocation) or other protocols may be used. IDE Runtime Environment 104 also includes a component repository 122, which maintains a list of available components that can be invoked either in the production stage or the development environment. When a new application component 108 is created and built for the first time in the IDE, it preferably registers itself automatically with Component Repository 122. The Repository 122 can later be queried and accessed by the IDE as needed. Also included in IDE Runtime Environment 104 is Policy Agent 124, which enforces policies created using Policy Manager 110.

Figure 2:
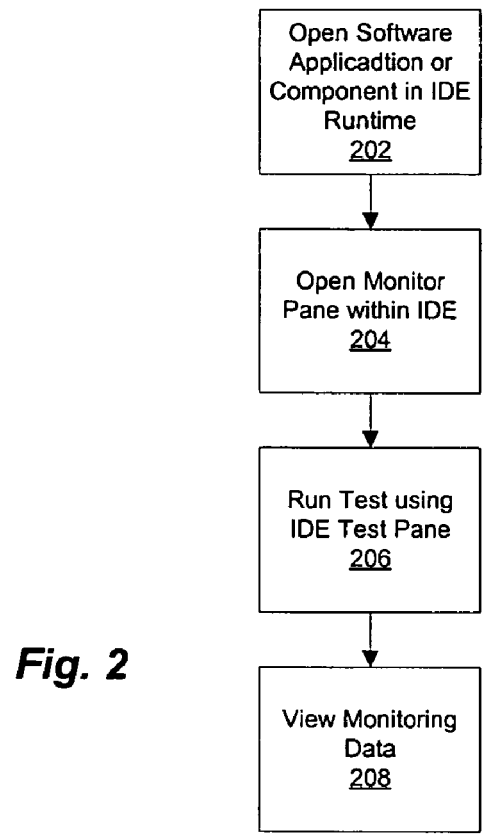
FIG. 2 is a flow chart illustrating a method for obtaining real-time production data in an Integrated Development Environment in accordance with an embodiment of the present invention.

Referring now to FIG. 2, there is shown a flow chart of a method in accordance with an embodiment of the present invention. First, using Instrumentor 114 of IDE UI 102, developer 106 specifies 202 a software application 108 or a component of a software application to be opened in IDE Runtime Environment 104. Next, the developer opens 204 a monitor pane within the IDE UI 102. Note that the instrumentation pane 114 and the monitor pane may be the same pane, subparts of a common pane, or different panes altogether—the choice is left to the implementer without departing from the spirit of the present invention. Next, the developer runs 206 a test of interest using the IDE test pane. Those of skill in the art will appreciate that IDE test panes are common in the art, and are used for testing components under development. Finally, the developer 106 can view 208 the monitoring data obtained using the test.

Figure 3:
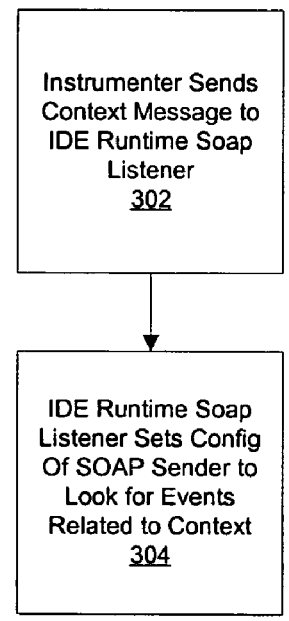
FIG. 3 is a flow chart illustrating a method for selecting a context for data collection in accordance with an embodiment of the present invention.

When the software application or component 108 is opened 202 in the IDE runtime environment, and referring now to FIG. 3, instrumentor 114 preferably sends 302 a message to the IDE Runtime SOAP Listener 120 to set the context for the component to be analyzed. Continuing the example of an order management service that is undergoing development, the message to the Listener 120 in a preferred embodiment is "Context=Order Management Service". The IDE Runtime SOAP Listener 120 then sets 304 the configuration of the SOAP sender 120 to look for Order Management Service-related events.

Figure 4:
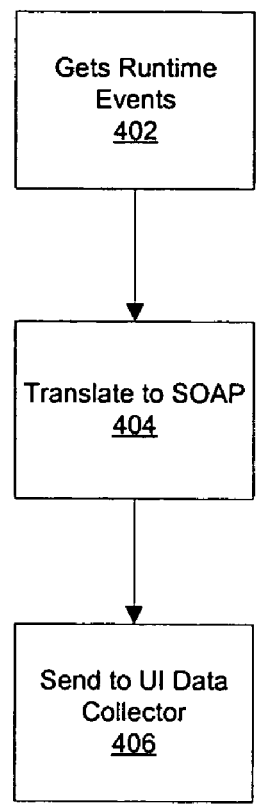
FIG. 4 is a flow chart illustrating the collection of runtime events sent to a data collector in accordance with an embodiment of the present invention.

At step 206, and referring now to FIG. 4, the running of the test using the IDE test pane begins by getting 402 a list of run time events for the given context. The events are then translated 404 into SOAP protocol by the SOAP sender, which takes an object, and converts it to a SOAP XML message for transport according to a specified protocol, for example HTTP. Once translated, the messages are sent 406 to the Data Collector 110 by the SOAP Sender 118.

Figure 5:
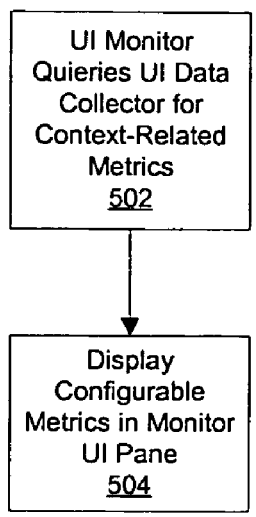
FIG. 5 is a flow chart illustrating a method for the display of collected production metrics in accordance with an embodiment of the present invention.

Referring now to FIG. 5, the step 208 of viewing the monitoring data includes the UI Monitor 112 querying 502 the UI data collector 110 for context-specific metrics, and displaying 504 configurable metrics in the Monitor UI pane. In the example described earlier, application component 108 is part of an order management service; thus order management service-specific metrics will be retrieved and displayed by Data Collector 110.

In one embodiment, developer 106 can selectively subscribe to alerts for their modules generated in production deployments. Such a subscription allows them to be notified of error conditions generated in production. In one embodiment, when a developer 106 logs in to the IDE 100, he is shown a list of alerts in the Monitor pane including all alerts generated since last login. In an alternative embodiment, the monitor hosts another management application configured to respond to alerts in a specified way, for example by sending an alphanumeric page to the developer 106.

The present invention enables effective development of web services that share operational policies by extending IDEs to automatically add in the needed capabilities. These extended IDEs can preferably test the shared operational policies running with each new web service, facilitate the making of modifications during both development and deployment, and also tie into the deployment management environment.

The present invention extends the functionality of the IDE so that developers can automatically secure and manage the web services they develop without the need for additional coding. Among other advantages, the present invention can lower development costs and complexity by having developers focus on application logic, not operational infrastructure implementation issues. In one embodiment, pre-packaged operational policies are provided, while in other embodiments the operational policies are authored by the enterprise.

Using Policy Manager 110, developers control non-business functionality through the IDE without having to write code. Policy Manager 110 allows developer 106 to specify operational concerns such as logging, authentication, encryption, caching—which are not core business logic, but are essential non-functional concerns that have to be addressed-graphically, through a separate pane. This separates business concerns from non-business concerns. Policy Manager 110 preferably has a UI component that allows developer 106 to specify the operational concerns, which are in turn communicated to Policy Agent 124 in the IDE Runtime Environment 104, in a preferred embodiment using SOAP. Once the operational concerns have been specified and communicated to Policy Agent 124, when any testing subsequently takes place in the IDE, the operational policies will be enforced by Policy Agent 124. In a preferred embodiment, the agent inserts itself inside of the application server stack. For example, the agent can be configured to intercept at the HTTP level if it is for a service invoked by HTTP; or it can be configured to intercept at the SOAP stack level if it is a web service, which can be invoked across multiple transports. When a message is received over any of these transports, the application server hands control to the agent, which invokes the appropriate pipeline for the particular service, and then returns control to the application server.

Figure 6:
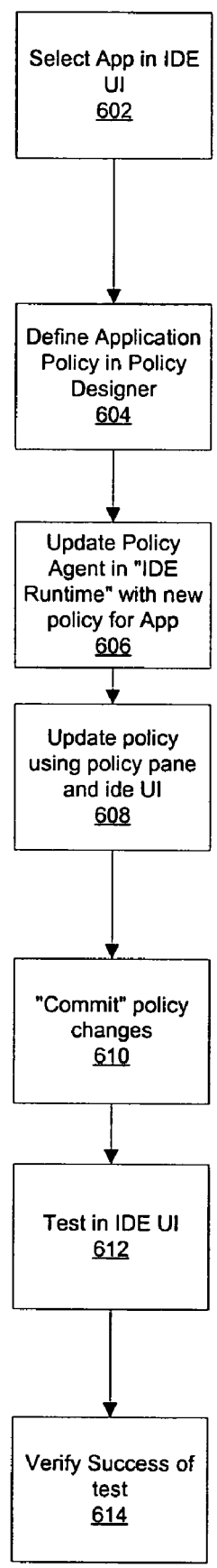
FIG. 6 is a flow chart illustrating a method for designing and enforcing a policy in accordance with an embodiment of the present invention.

Referring now to FIG. 6 there is shown a flowchart illustrating a method of using the Policy Manager in accordance with an embodiment of the present invention. First, developer 106 selects 602 an application component 108 using the IDE UI 102. Next, developer 106 defines 604 a policy for the application using the Policy Manager 110. Once the policy is defined, it is communicated 606 to Policy Agent 124. The policy can be updated 608 and re-communicated to the Policy Agent until the developer 106 is ready to commit the policy changes, which he does at step 610. Next, the application component 108 is tested 612 with the applied policy enforced, and the success is verified 614.

Recall that the IDE run-time environment 104 has a listener 120, listening for events. When a policy is changed using Policy Manager 110, the resulting policy pipeline is communicated to the IDE Runtime Environment, where listener 120 updates the policy for that service. Any subsequent requests received for the affected service are then evaluated to ensure that the policy pipeline is executed.

The present invention has been described in particular detail with respect to a limited number of embodiments. Those of skill in the art will appreciate that the invention may additionally be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of Monitor 112 and so forth may be provided in many or one module.

Some portions of the above description present the feature of the present invention in terms of algorithms and symbolic representations of operations on information. These algorithmic descriptions and representations are the means used by those skilled in the software development arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A method for integrating runtime metrics into an integrated development environment (IDE), the IDE including a runtime environment and a user interface environment, the method comprising:

defining a policy specifying an operational concern to be monitored in the IDE runtime environment through a policy manager of the IDE user interface enfironment;

determining an application component of an application to be monitored in the IDE based on the policy, the application comprising operational logic and business logic, the application component being selected from the operational logic of the application and having associated information in a component repository of the IDE runtime environment, wherein the component repository is configured to provide a list of components that are available to be invoked by the IDE runtime environment;

monitoring the application component with a policy agent executing in the IDE runtime environment and enforcing the policy specifying the operational concern to determine a plurality of metrics associated with the application component;

transmitting the plurality of metrics to a data collector of the IDE user interface environment; and displaying the metrics to a user of the IDE through the IDE user interface environment.

2. A method as recited by claim 1, the method further comprising:

providing, to the user of the IDE, an alert notifying the user of an error condition generated by the application component in production.

3. A method as recited by claim 2, wherein providing an alert comprises displaying, for the user, a list of alerts generated since a last login by the user.

4. A method as recited by claim 2, wherein providing an alert comprises sending an alphanumeric page to the user.

5. A method as recited by claim 1, the method further comprising:

communicating the policy specifying the operational concern from the policy manager of the IDE user interface environment to the policy agent in the IDE runtime environment.

6. A method as recited by claim 5, wherein the operational concern is selected from the group consisting of a logging policy, an authentication policy, an encryption policy, and a caching policy.

7. A method as recited by claim 1, further comprising:

allowing the user to create the application component in the IDE; and automatically registering the application component, when it has been created, with the component repository.

8. A method as recited by claim 7, wherein determining an application component to be monitored comprises:

providing, from the component repository, a list of application components that can be invoked; and allowing the user of the IDE to specify an application component to be opened in the IDE runtime environment.

9. A computer program embodied on a computer readable storage medium, the computer program comprising a set of instructions which when executed by a computer, cause the computer to:

define a policy specifying an operational concern to be monitored in an integrated development environment (IDE) runtime environment through a policy manager of an IDE user interface environment;

determine an application component of an application to be monitored in the IDE runtime environment based on the policy, the application comprising operational logic and business logic, the application component being selected from the operational logic of the application and having associated information in a component repository of the IDE runtime environment, wherein the component repository is configured to provide a list of components that are available to be invoked by the IDE runtime environment;

monitor the application component with a policy agent executing in the IDE runtime environment and enforcing the policy specifying the operational concern to determine a plurality of metrics associated with the application component;

transmit the plurality of metrics to a data collector of the IDE user interface environment; and display the metrics to a user of the IDE through the IDE user interface environment.

10. A computer system comprising a processor and a computer readable medium, the computer readable medium having stored thereon a computer program executable by the processor, the computer program comprising:

a component repository configured to maintain a list of available application components that can be invoked by an integrated development environment ("IDE") runtime environment to monitor an application, the application comprising operational logic and business logic;

an IDE runtime environment configured to open an application component, the IDE runtime environment comprising:

a policy agent configured to monitor operation of the application component to determine a plurality of metrics associated with the application component by enforcing a policy specifying an operational concern to be monitored in the IDE, wherein the application component is selected from the operational logic of the application; and an IDE user interface environment configured to allow a user to perform software development tasks, the IDE user interface environment comprising:

a policy manager configured to define the policy specifying the operational concern to be monitored in the IDE;

an instrumentor in communication with the IDE runtime environment, the instrumentor being configured to allow a user to control operation of the IDE runtime environment; and a data collector in configuration with the IDE runtime environment, the data collector being configured to display at least some of the plurality of metrics associated with the application component.

11. A computer system as recited in claim 10, wherein the IDE runtime environment comprises the component repository.

12. A computer system as recited in claim 10, wherein the IDE user interface environment comprises a monitor, and wherein the monitor comprises the instrumentor and the data collector.

13. A computer system as recited in claim 10, wherein the IDE runtime environment comprises:

a listener in communication with the instrumentor, the listener being configured to receive instructions from the instrumentor for controlling operation of the IDE runtime environment; and a sender in communication with the data collector, the sender being configured to translate events generated by the operation of the application component into messages, and to send the messages to the data collector.

14. A computer system as recited in claim 10, wherein the computer program comprises further instructions executable by the processor to:

allow the user to create an application component in the IDE user interface environment; and automatically register the application component, when it has been created, with the component repository.

15. A computer system as recited in claim 10, wherein the instrumentor is configured to allow a user to control operation of the IDE runtime environment by specifying a particular application component that should be monitored.

16. A computer system as recited in claim 10, wherein the instrumentor is configured to allow a user to control operation of the IDE runtime environment by setting a context for the application component to be monitored.

17. A computer system as recited in claim 16, wherein the metrics displayed by the data collector are related to the context specified by the instrumentor.

18. A computer system as recited in claim 10, wherein the IDE runtime environment is configured to monitor application components in a production environment.

19. A computer system as recited in claim 18, wherein the component repository is configured to maintain a list of available application components that can be invoked either in the production environment or in a development environment.

20. A computer system as recited in claim 10, wherein the IDE user interface environment communicates with the IDE runtime environment using one or more protocols selected from the group consisting of the simple object access protocol ("SOAP"), the java message service, and remote method invocation.

* * * * *

UNITED STATES PATENT AND TRADEMARK OFFICE
CERTIFICATE OF CORRECTION

PATENT NO. : 7,802,234 B2  Page 1 of 1
APPLICATION NO. : 10/751333
DATED : September 21, 2010
INVENTOR(S) : Sekhar Sarukkai et al.

It is certified that error appears in the above-identified patent and that said Letters Patent is hereby corrected as shown below:

On sheet 2 of 4, in Figure 2, Box 202, line 2, delete "Applicadtion" and insert -- Application --, therefor.

In column 7, line 56, in claim 1, delete "enfironment;" and insert -- environment; --, therefor.

In column 8, line 42, in claim 9, delete "medium" and insert -- memory --, therefor.

Signed and Sealed this
Twenty-second Day of November, 2011

David J. Kappos
*Director of the United States Patent and Trademark Office*